US012010586B2

(12) United States Patent
Hosoda et al.

(10) Patent No.: US 12,010,586 B2
(45) Date of Patent: Jun. 11, 2024

(54) POSITION ESTIMATION METHOD, POSITION ESTIMATION SYSTEM, POSITION ESTIMATION SERVER, AND POSITION ESTIMATION PROGRAM

(71) Applicant: NIPPON TELEGRAPH AND TELEPHONE CORPORATION, Tokyo (JP)

(72) Inventors: Masamichi Hosoda, Musashino (JP); Tadashi Mori, Musashino (JP); Masaru Miyamoto, Musashino (JP); Hiroshi Sakamoto, Musashino (JP); Tomoki Murakami, Musashino (JP); Tomoaki Ogawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 372 days.

(21) Appl. No.: 17/428,270

(22) PCT Filed: Jan. 27, 2020

(86) PCT No.: PCT/JP2020/002753
§ 371 (c)(1),
(2) Date: Aug. 3, 2021

(87) PCT Pub. No.: WO2020/162251
PCT Pub. Date: Aug. 13, 2020

(65) Prior Publication Data
US 2022/0109955 A1   Apr. 7, 2022

(30) Foreign Application Priority Data
Feb. 6, 2019 (JP) .................................. 2019-020139

(51) Int. Cl.
*H04W 4/029* (2018.01)
*G01S 13/87* (2006.01)
(Continued)

(52) U.S. Cl.
CPC ........... *H04W 4/029* (2018.02); *G01S 13/876* (2013.01); *H04B 17/318* (2015.01); *H04L 43/0864* (2013.01)

(58) Field of Classification Search
CPC ...... H04W 4/029; G01S 13/876; G01S 7/006; G01S 13/765; G01S 5/02; G01S 5/14; H04B 17/318; H04B 17/27; H04L 43/0864
(Continued)

(56) References Cited

U.S. PATENT DOCUMENTS

2010/0135178 A1 *  6/2010  Aggarwal ............. H04W 24/00
                                                         370/252
2010/0311456 A1 * 12/2010  Inoue ..................... H04W 16/28
                                                         455/513
(Continued)

FOREIGN PATENT DOCUMENTS

JP    200453510 A    2/2004
JP    2008178006 A   7/2008
(Continued)

OTHER PUBLICATIONS

Masamichi Hosoda et al., Wireless LAN Station Position Estimation Method by Access Point using Distributed Antenna System, FIT2018 (17th Information Science and Technology Forum) vol. 4, Sep. 19, 2018, pp. 59-64.

*Primary Examiner* — Hirdepal Singh
(74) *Attorney, Agent, or Firm* — Harness, Dickey & Pierce, P.L.C.

(57) ABSTRACT

Provided is a position estimation method in which a measurement signal and a response signal are transmitted and received between multiple n wireless stations respectively provided with known antennas installed at known positions different from each other and a wireless terminal station provided with a terminal antenna, RTT, which is a round-trip delay time of the transmission and reception, and RSSI, which is a strength of received radio waves of the signals, are measured, and a position of the wireless terminal station is estimated. The method includes: obtaining, as the position of the wireless terminal station, a solution of simultaneous equations of an RTT evaluation function $f_{rt}$ for evaluating the estimate value of the position of the wireless terminal station that is estimated based on the RTT measured between the wireless terminal station and the known antenna i (i=1, 2, . . . , n), and an RSSI evaluation function $f_{rl}$ for evaluating the estimate value of the position of the wireless terminal (Continued)

station that is estimated based on the RSSI, or a value obtained by searching for an estimate value so that an error evaluation function $f_{error}$ obtained by combining the RTT evaluation function and the RSSI evaluation function is minimum.

18 Claims, 7 Drawing Sheets

(51) Int. Cl.
    *H04B 17/318* (2015.01)
    *H04L 43/0864* (2022.01)

(58) Field of Classification Search
    USPC ...................................................... 455/456.1
    See application file for complete search history.

(56) References Cited

U.S. PATENT DOCUMENTS

| | | | | |
|---|---|---|---|---|
| 2014/0185520 A1* | 7/2014 | Gao | ...................... | H04W 64/00 370/328 |
| 2016/0255471 A1* | 9/2016 | Marri Sridhar | ...... | H04B 17/318 455/456.2 |
| 2019/0037529 A1* | 1/2019 | Edge | .................... | H04B 7/0897 |

FOREIGN PATENT DOCUMENTS

| | | |
|---|---|---|
| JP | 20092886 A | 1/2009 |
| JP | 2010190629 A | 9/2010 |
| JP | 2013174472 A | 9/2013 |

\* cited by examiner

POSITION ESTIMATION METHOD, POSITION ESTIMATION SYSTEM, POSITION ESTIMATION SERVER, AND POSITION ESTIMATION PROGRAM

CROSS-REFERENCE TO RELATED APPLICATIONS

This application is a 371 U.S. National Phase of International Application No. PCT/JP2020/002753 filed on Jan. 27, 2020, which claims priority to Japanese Application No. 2019-020139 filed on Feb. 6, 2019. The entire disclosures of the above applications are incorporated herein by reference.

TECHNICAL FIELD

The present invention relates to a position estimation method, a position estimation system, a position estimation server, and a position estimation program that estimates the position of a wireless terminal station based on known positions of a plurality of antennas.

BACKGROUND ART

There is a method in which the position of a wireless terminal station is estimated using distributed antennas, based on Round Trip Time (RTT) and a Received Signal Strength Indicator (RSSI) between the plurality of antennas whose positions are known and the terminal (NPL 1).

CITATION LIST

Non Patent Literature

[NPL 1] Masamichi HOSODA, Hiroshi SAKAMOTO, Tomoki MURAKAMI, Yasushi HANAKAGO, Makoto UMEUCHI, Tadashi MOURI, Tomoaki OGAWA, and Masaru MIYAMOTO "Wireless LAN Terminal Position Estimation Method by Access Point Using Distributed Antenna System", FIT2018 (Forum on Information technology 2018) vol. 4, pp. 59-64, September 2018.

SUMMARY OF THE INVENTION

Technical Problem

In the method disclosed in NPL 1, a position estimation formula using RTT and a position estimation formula using RSSI are completely independent from each other and coordinates are obtained with both of the formulae, resulting in two types of coordinates with different accuracies. Furthermore, calculation processes are also completely independent from each other, and thus position estimation calculations cannot be integrated taking into consideration both of the accuracies. Also, to obtain one position estimation result, it is necessary to obtain two types of coordinates separately and then integrate these coordinates.

NPL 1 discloses none of specific formula and calculation method for estimating the position two-dimensionally or three-dimensionally. When three-dimensional position estimation using RTT is performed, it is easily conceivable to apply a GPS calculation method to perform the position estimation, but no specific formula or calculation method for three-dimensional position estimation using RSSI is given.

Also, no specific formula or calculation method for two-dimensional position estimation using both RTT and RSSI is given.

In the position estimation formula using RSSI of NPL 1, a spatial propagation loss coefficient $\alpha$ needs to be determined through e.g., calculation in advance based on the actual space.

In the method of NPL 1, in addition to the GPS calculation method, trajectories are used, and when two-dimensional position estimation using RTT is performed, it is sufficient to obtain the intersection of two hyperbolas. However, when the number of antennas is three or more, there are two or more hyperbolas and there may be no intersection at which all of the hyperbolas intersect with each other, and in this case, position estimation is impossible. Similarly, when three-dimensional position estimation using RTT is performed based on trajectories, when the number of antennas is four or more, there are three or more two-sheet hyperboloids of revolution, and there may be no intersection at which all of the hyperboloids intersect with each other, and in this case, position estimation is impossible. Similarly, also in the case of RSSI, when the number of antennas is large, there may be no intersection at which all of the circles or spheres intersect with each other, and in this case, position estimation is impossible.

If measurement values of RTT/RSSI have an error, there may be a case where the coordinates of the position estimation results largely differ from each other, and coordinates are output that are outside the range in which the terminal is movable (can exist).

Since NPL 1 uses distributed antennas, the cost is required for laying a coaxial cable or the like between the antennas whose positions are known and the AP.

An object of the present invention is to provide a position estimation method, a position estimation system, a position estimation server, and a position estimation program that can accurately estimate the position of a wireless terminal station using RTT or/and RSSI.

Means for Solving the Problem

A first invention relates to a position estimation method in which a measurement signal and a response signal are transmitted and received between multiple n wireless stations respectively provided with known antennas installed at known positions different from each other and a wireless terminal station provided with a terminal antenna, RTT, which is a round-trip delay time of the transmission and reception, is measured, and a position of the wireless terminal station is estimated, the method including: obtaining, as the position of the wireless terminal station, a solution of simultaneous equations of an RTT evaluation function $f_{ti}$ for evaluating the estimate value of the position of the wireless terminal station that is estimated based on the RTT measured between the wireless terminal station and the known antenna i (i=1, 2, . . . , n) and a range evaluation function $f_L$ for imposing a penalty on an evaluation value if the estimate value of the position of the wireless terminal station is outside a range in which the wireless terminal station is to be present, or a value obtained by searching for an estimate value so that an error evaluation function $f_{error}$ obtained by combining the RTT evaluation function and the range evaluation function is minimum.

A second invention relates to a position estimation method in which a measurement signal and a response signal are transmitted and received between multiple n wireless stations respectively provided with known antennas installed at known positions different from each other and a wireless terminal station provided with a terminal antenna, RSSI, which is a strength of received radio waves of the signals, is measured, and a position of the wireless terminal station is estimated, the method including: obtaining, as the position of the wireless terminal station, a solution of simultaneous equations of RSSI evaluation functions $f_{ri}$ for evaluating the estimate value of the position of the wireless terminal station that is estimated based on the RSSI measured between the wireless terminal station and the known antenna i (i=1, 2, . . . , n), or a value obtained by searching for an estimate value so that an error evaluation function $f_{error}$ obtained by combining the RSSI evaluation functions with each other is minimum.

A third invention relates to a position estimation method in which a measurement signal and a response signal are transmitted and received between multiple n wireless stations respectively provided with known antennas installed at known positions different from each other and a wireless terminal station provided with a terminal antenna, RSSI, which is a strength of received radio waves of the signals, is measured, and a position of the wireless terminal station is estimated, the method including: obtaining, as the position of the wireless terminal station, a solution of simultaneous equations of an RSSI evaluation function $f_{ri}$ for evaluating the estimate value of the position of the wireless terminal station that is estimated based on the RSSI measured between the wireless terminal station and the known antenna i (i=1, 2, . . . , n) and a range evaluation function $f_L$ for imposing a penalty on an evaluation value if the estimate value of the position of the wireless terminal station is outside a range in which the wireless terminal station is to be present, or a value obtained by searching for an estimate value so that an error evaluation function $f_{error}$ obtained by combining the RSSI evaluation function and the range evaluation function is minimum.

A fourth invention relates to a position estimation method in which a measurement signal and a response signal are transmitted and received between multiple n wireless stations respectively provided with known antennas installed at known positions different from each other and a wireless terminal station provided with a terminal antenna, RTT, which is a round-trip delay time of the transmission and reception, and RSSI, which is a strength of received radio waves of the signals, are measured, and a position of the wireless terminal station is estimated, the method including: obtaining, as the position of the wireless terminal station, a solution of simultaneous equations of an RTT evaluation function $f_{ti}$ for evaluating the estimate value of the position of the wireless terminal station that is estimated based on the RTT measured between the wireless terminal station and the known antenna i (i=1, 2, . . . , n) and an RSSI evaluation function $f_{ri}$ for evaluating the estimate value of the position of the wireless terminal station that is estimated based on the RSSI, or a value obtained by searching for an estimate value so that an error evaluation function $f_{error}$ obtained by combining the RTT evaluation function and the RSSI evaluation function is minimum.

A fifth invention relates to a position estimation method in which a measurement signal and a response signal are transmitted and received between multiple n wireless stations respectively provided with known antennas installed at known positions different from each other and a wireless terminal station provided with a terminal antenna, RTT, which is a round-trip delay time of the transmission and reception, and RSSI, which is a strength of received radio waves of the signals, are measured, and a position of the wireless terminal station is estimated, the method including: obtaining, as the position of the wireless terminal station, a solution of simultaneous equations of an RTT evaluation function $f_{ti}$ for evaluating the estimate value of the position of the wireless terminal station that is estimated based on the RTT measured between the wireless terminal station and the known antenna i (i=1, 2, . . . , n), an RSSI evaluation function $f_{ri}$ for evaluating the estimate value of the position of the wireless terminal station that is estimated based on the RSSI, and a range evaluation function $f_L$ for imposing a penalty on an evaluation value if the estimate value of the position of the wireless terminal station is outside a range in which the wireless terminal station is to be present, or a value obtained by searching for an estimate value so that an error evaluation function $f_{error}$ obtained by combining the RTT evaluation function, the RSSI evaluation function, and the range evaluation function is minimum.

A sixth invention relates to a position estimation system for estimating a position of a wireless terminal station by the position estimation method according to any one of the first to fifth inventions, wherein the RTT or/and the RSSI measured by each of the multiple n wireless stations respectively provided with the known antennas is forwarded to a position estimation server, and the position estimation server is configured to calculate the RTT evaluation function $f_{ti}$ or/and the RSSI evaluation function $f_{ri}$ and obtain the position of the wireless terminal station.

A seventh invention relates to a position estimation system for estimating a position of a wireless terminal station by the position estimation method according to any one of the first to fifth inventions, wherein the multiple n known antennas are distributed antennas that are disposed while being distributed from a wireless base station via cables having known lengths, the RTT or/and the RSSI measured for each distributed antenna by the wireless base station is forwarded to a position estimation server, and the position estimation server is configured to calculate the RTT evaluation function $f_{ti}$ or/and the RSSI evaluation function $f_{ri}$ and obtain the position of the wireless terminal station.

An eighth invention relates to a position estimation server for estimating a position of a wireless terminal station by the position estimation method according to any one of the first to fifth inventions, wherein the RTT or/and the RSSI measured by each of the multiple n wireless stations respectively provided with the known antennas is forwarded to the position estimation server, and the position estimation server is configured to calculate the RTT evaluation function $f_{ti}$ or/and the RSSI evaluation function $f_{ri}$ and obtain the position of the wireless terminal station.

A ninth invention relates to a position estimation program for causing a computer to execute processing that is executed by the position estimation server according to the eighth invention, so as to calculate the RTT evaluation function $f_{ti}$ or/and the RSSI evaluation function $f_{ri}$, and obtain the position of the wireless terminal station.

Effects of the Invention

The present invention can accurately estimate the position of a wireless terminal station using RTT or/and RSSI, and can execute position estimation with an integration of both the RTT and the RSSI at once. It is also possible to take into consideration the accuracies or reliabilities of both the RTT and the RSSI by adding weights, and to adjust which of the RTT and the RSSI is to be considered to be important.

Also, specific position estimation can be performed two-dimensionally or three-dimensionally.

Also, in a case where many known antennas can be used, measurements of both RTT and RSSI are possible, and the measured values each have a smaller measurement error, position estimation using RSSI is possible even if the spatial propagation loss coefficient α is not known. With this, α can also be measured, and thus a configuration is also possible in which α is once measured in such an environment and then this α is used as a known value at the time of actual operation, so that position estimation can be performed much economically, namely, with a smaller number of known antennas and typical accuracy.

Also, even if a RTT or/and RSSI measurement value has an error, the use of a range evaluation function prevents the coordinates obtained as a result of position estimation from largely deviating from the range.

A configuration is also possible in which position estimation is performed without using distributed antennas, and in this case, there is no need to provide a cable between antennas whose positions are known and an AP, making it possible to realize a cost reduction.

DESCRIPTION OF EMBODIMENTS

Figure 1:
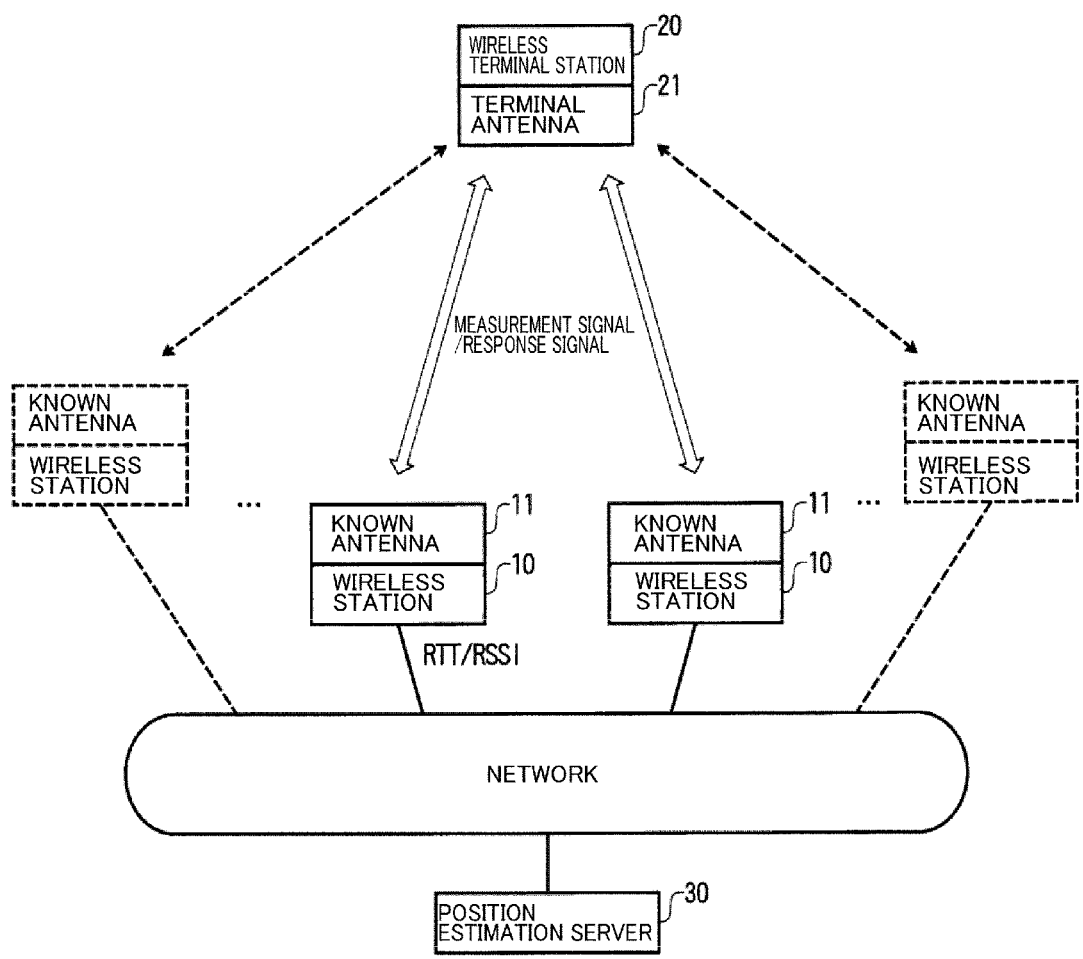
FIG. 1 is a diagram illustrating an example of an overall configuration of a position estimation system according to the present invention.

FIG. 1 shows an example of an overall configuration of a position estimation system of the present invention.

In FIG. 1, there are two or more known antennas 11 of wireless stations 10 whose positions are known, and measurement signals and response signals are exchanged between the known antennas 11 and a terminal antenna 21 of a wireless terminal station 20 whose position is unknown, and either or both of RTT and RSSI are measured. The measurement values are collected in the position estimation server 30 from the wireless stations 10 via a network. The position estimation server 30 performs position estimation calculation to calculate and estimate the positions of the wireless terminal station 20 and the terminal antenna 21.

Figure 2:
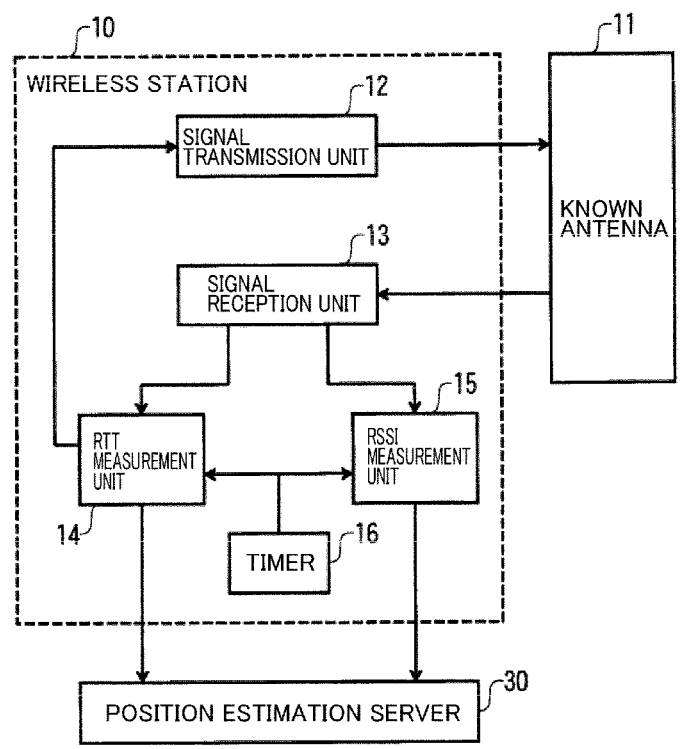
FIG. 2 is a diagram illustrating an example of a configuration of a wireless station 10.

FIG. 2 shows an example of a configuration of the wireless station 10 according to the present invention.

In FIG. 2, the wireless station 10 includes a signal transmission unit 12 and a signal reception unit 13 that are connected to the known antenna 11, an RTT measurement unit 14 and an RSSI measurement unit 15 that are connected to the signal reception unit 13, and a timer 16, and the position estimation server 30 is connected to the RTT measurement unit 14 and the RSSI measurement unit 15.

Figure 3:
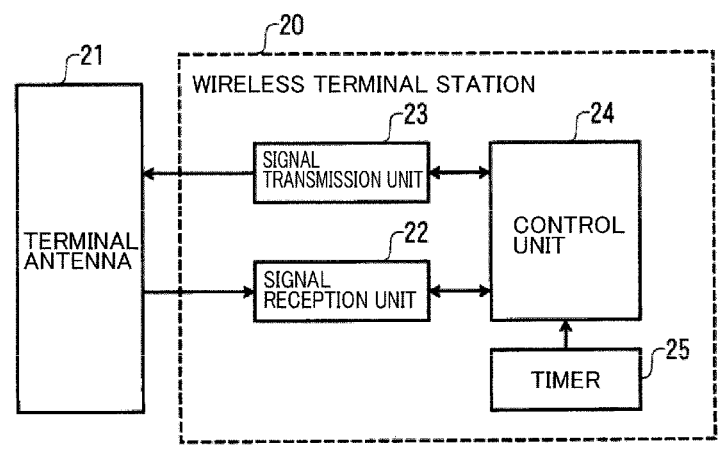
FIG. 3 is a diagram illustrating an example of a configuration of a wireless terminal station 20.

FIG. 3 shows an example of a configuration of the wireless terminal station 20 according to the present invention.

In FIG. 3, the wireless terminal station 20 includes a signal reception unit 22 and a signal transmission unit 23 that are connected to the terminal antenna 21, a control unit 24, and, if necessary, a timer 25.

(1) Measurement of RTT/RSSI (1.1) Example 1 of Measurement of RTT/RSSI

Figure 4:
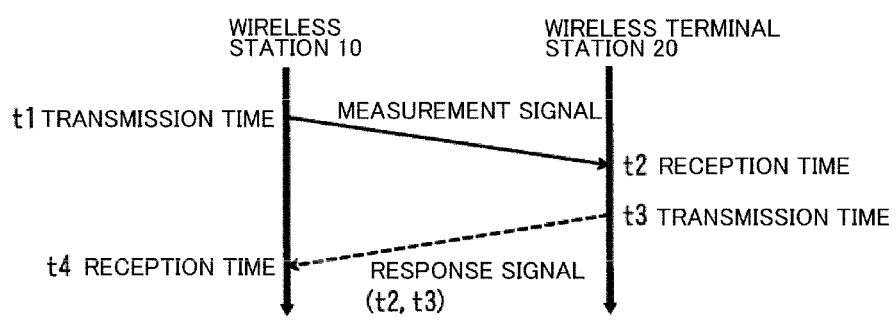
FIG. 4 is a diagram illustrating Example 1 of a measurement and response signal sequence.

FIG. 4 shows Example 1 of a measurement and response signal sequence.

In FIG. 4, a measurement signal is transmitted from the wireless station 10 to the wireless terminal station 20, and a response signal is returned by the wireless terminal station 20 to the wireless station.

(1.1.1) Measurement Signal and Response Signal

An action frame or management frame of a wireless LAN can be used as the measurement signal. Upon receiving it, the wireless terminal station 20 returns ACK, which can thus be used as the response signal. Of course, another type of frame such as a data frame may also be used as the measurement signal or the response signal. Besides a wireless LAN, another wireless communication method with which the measurement signal and the response signal can be exchanged may also be used.

(1.1.2) RTT Measurement

In the case of RTT measurement, when transmitting the measurement signal from the RTT measurement unit 14 via the signal transmission unit 12, the wireless station 10 records time t1 of the transmission using the timer 16. In the wireless terminal station 20, upon receiving the measurement signal at the signal reception unit 22, the control unit 24 controls the signal transmission unit 23 to transmit the response signal. At this time, reception time t2 at which the measurement signal has been received, and transmission time t3 at which the response signal has been transmitted may also be recorded using the timer 25. In the wireless station 10, upon receiving the response signal at the signal reception unit 13, the RTT measurement unit 14 records time t4 of the reception using the timer 16.

The RTT measurement unit 14 can calculate (t4−t1) to obtain RTT that includes a terminal delay time (t3−t2), which is a delay time of the wireless terminal station 20. This is defined as raw RTT. If only the raw RTT is to be measured, the timer 25 of the wireless terminal station 20 is unnecessary.

If the wireless terminal station 20 includes the timer 25 and can record t2 and t3, the wireless station 10 may be notified of the terminal delay time (t3−t2), or t2 and t3 themselves, using a method in which it is added to the response signal or another signal, or the like. Accordingly, by calculating ((t4−t1)−(t3−t2)), it is possible to obtain the RTT from which the terminal delay time is removed. This is defined as delay-excluded RTT.

(1.1.3) RSSI Measurement

In the case of RSSI measurement, the wireless station 10 acquires, using the RSSI measurement unit 15, an RSSI when the response signal is received by the signal reception unit 13.

(1.2) Example 2 of RTT/RSSI Measurement

Figure 5:
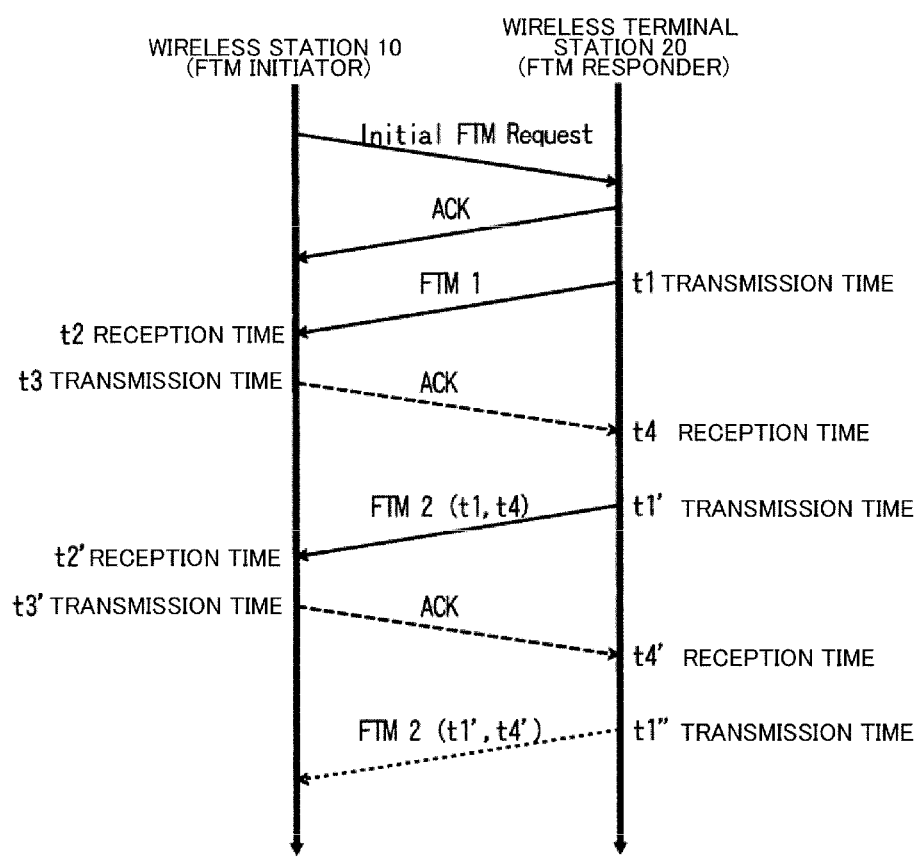
FIG. 5 is a diagram illustrating Example 2 of a measurement and response signal sequence.

FIG. 5 shows Example 2 of a measurement and response signal sequence. Here, FTM (Fine Timing Measurement) of IEEE Std 802.11-2016 is used.

(1.2.1) RTT Measurement

In the wireless station 10, the RTT measurement unit 14 serves as an initiator to cause the signal transmission unit 12 to transmit an Initial FTM Request to the wireless terminal station 20, and requests the wireless terminal station 20 to transmit a measurement signal specified number of times. In the wireless terminal station 20, when the signal reception unit 22 receives the Initial FTM Request, the control unit 24 starts operating as a responder. In the wireless terminal station 20, the signal transmission unit 23 transmits FTM1 as the first measurement signal, and the control unit 24 records the transmission time thereof as t1 using the timer 25. Upon receiving the FTM1, the wireless station 10 returns ACK as a response signal. At this time, the RTT measurement unit 14 records the reception time as t2 and the transmission time as t3, using the timer 16. Upon receiving the ACK, the wireless terminal station 20 transmits the next measurement signal FTM2. At this time, the control unit 24 records the reception time as t4 and the transmission time as t1', using the timer 25. The second measurement signals onwards contains the previous transmission time t1 and the reception time t4.

Thereafter, similarly, the round trip of a measurement signal and a response signal is continued until the number of times specified by the first request is reached, and the wireless station 10 and the wireless terminal station 20 record their transmission time and reception time, and add the previous time (t1, t4) to the measurement signal. Accordingly, the wireless station 10 can receive the measurement signal containing the previous time (t1, t4), and can calculate ((t4−t1)−(t3−t2)) using the previous reception time t2 and transmission time t3 that were recorded in the RTT measurement unit 14, thereby obtaining the delay-excluded RTT of the round trip of the previous measurement signal and response signal.

Here, this sequence has the inverted direction with respect to that of the measurement and response signal sequence shown in FIG. 4, but the wireless station 10 can serve as a trigger and measure the delay-excluded RTT between the wireless station 10 and the wireless terminal station 20.

(1.2.2) RSSI Measurement

In the case of RSSI measurement, in the wireless station 10, the RSSI measurement unit 15 obtains RSSIs when the measurement signals FTM1, FTM2, and the like are received by the signal reception unit 13.

(1.3) Example of Configuration with Distributed Antenna

In the system configuration of FIG. 1, it is assumed that the positions of the known antennas 11 of the wireless stations 10 are known, and measurement signals and response signals are exchanged between the antennas 11 and the terminal antenna 21 of the wireless terminal station 20 so that RTT or RSSIs are measured, but another configuration is also conceivable.

Figure 6:
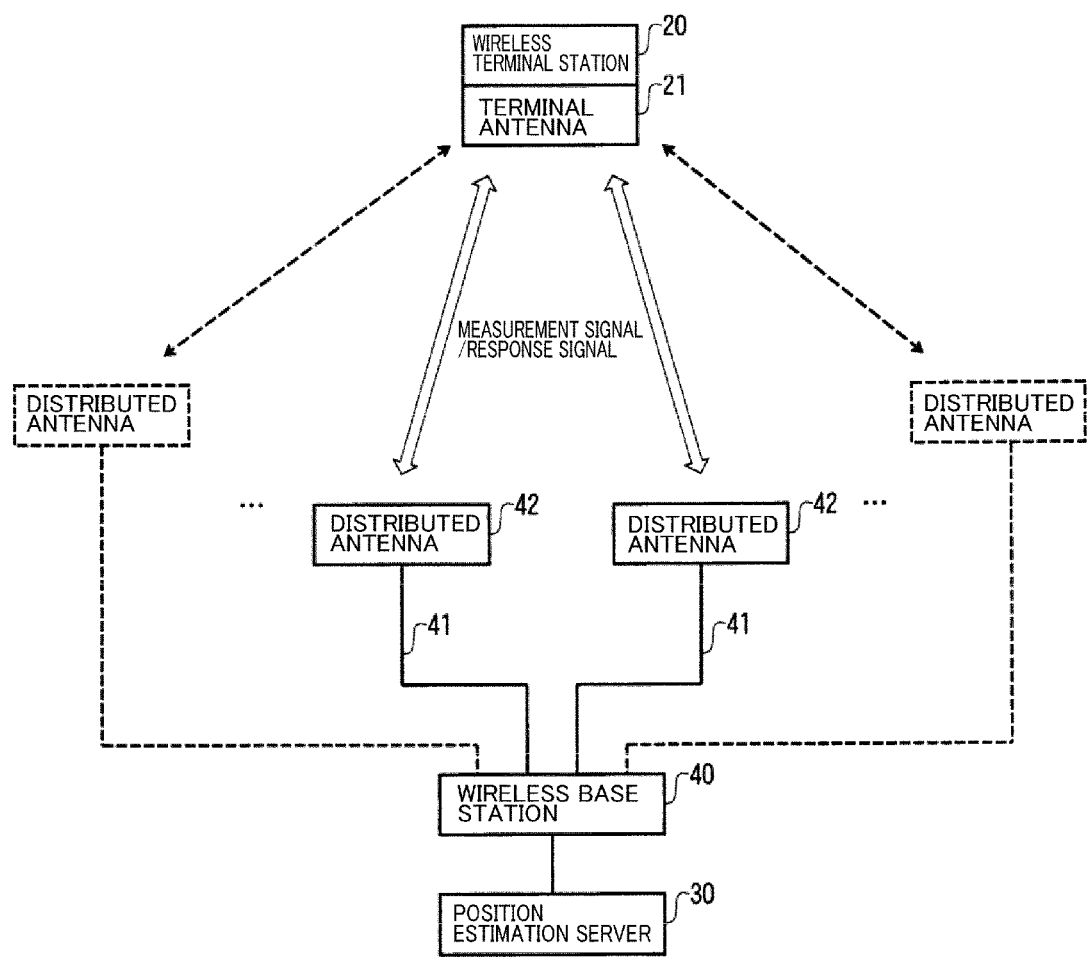
FIG. 6 is a diagram illustrating another example of the overall configuration of the position estimation system of the present invention.

If, for example, distributed antennas are already installed and no cost for laying a new cable will be incurred, the plurality of pairs of wireless station 10 and known antenna 11 shown in FIG. 1 may be replaced by a plurality of distributed antennas 42 connected to each other via one wireless base station 40 and cables 41, as shown in FIG. 6.

In this case, by performing the following correction, it is possible to obtain a measurement value equivalent to that obtained by the configuration shown in FIG. 1, and to use the same position estimation calculation method. The above-described correction is to correct the raw RTT, the delay-excluded RTT, and the RSSI taking into consideration a loss and a delay that are caused by the passage of the cables 41.

(1.4) Summary of RTT/RSSI Measurement

With the above-described method, the wireless station 10 or the wireless base station 40 can measure some or all of raw RTT, delay-excluded RTT, and RSSI, and transmits the measured results to the position estimation server 30 via the network.

(2) Position Estimation

Figure 7:
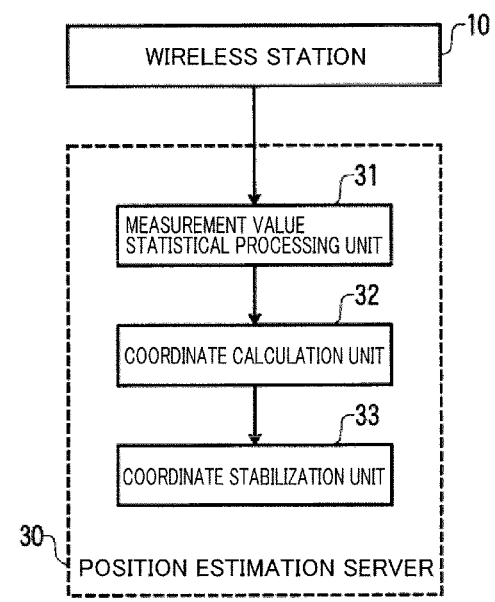
FIG. 7 is a diagram illustrating an example of a configuration of a position estimation server 30.

FIG. 7 shows an example of a configuration of the position estimation server 30 according to the present invention.

In FIG. 7, the position estimation server 30 includes a measurement value statistical processing unit 31 connected to the wireless station 10, a coordinate calculation unit 32, and a coordinate stabilization unit 33.

(2.1) Measurement Value Statistical Processing Unit 31

The wireless terminal station 20 executes not only processing of measurement signals and response signals but also another type of processing at the same time, and thus the terminal delay time may vary depending on the status of the other type of processing. Accordingly, if the wireless station 10 is configured to be able to measure only raw RTT, the measurement value statistical processing unit 31 may execute statical processing for each known antenna 11 to obtain the statically processed RTT from which a variation is removed using a method such as outlier removal, moving average, or regression. Because delay-excluded RTT does not contain terminal delay time and thus a variation is small, it is an option whether or not statical processing is performed. Similarly, with respect to RSSI, it is an option whether or not statical processing is performed.

In the measurement value statistical processing unit 31, the reliability, which serves as an index of precision, of an RTT measurement value or an RSSI measurement value may be calculated for each known antenna 11. For example, the calculation is possible using a standard such that the reliability of measurement values of the known antenna 11 is high if the number of measurement in a certain past period of time is large, or the reliability of measurement values of the known antenna 11 is high if the dispersion or standard deviation of measurement values in a certain past period of time is small. Also, the reliability can be corrected depending on the characteristics and places of each known antenna 11 and the surrounding state. For example, letting the number of times of measurement during a certain past period of time be s and the standard deviation be σ, and letting, as correction parameters of each known antenna 11, the correction factor of the number of times of measurement be $a_{size}$, the correction offset be $b_{size}$, the correction factor of standard deviation be $a_{sigma}$, and the correction offset of standard deviation be $b_{sigma}$, the reliability w can be obtained as follows:

$$w = (a_{size} \cdot s + b_{size})/(a_{sigma} \cdot \sigma + b_{sigma})$$

(2.2) Coordinate Calculation Unit 32

In the coordinate calculation unit 32, there is no need to distinguish raw RTT, delay-excluded RTT, and statically processed RTT, and thus calculation is performed dealing with any one of them as RTT.

(2.2.1) Assumption of Coordinate Calculation

It is assumed that the number of known antennas 11 or distributed antennas 42 is n, and the known antennas 11 or distributed antennas 42 are collectively referred to as a known antenna i (i=1, 2, . . . , n).

The two-dimensional coordinates of the known antenna i are given as $(x_i, y_i)$, and the three-dimensional coordinates of the known antenna i are given as $(x_i, y_i, z_i)$. These coordinates are known and the unit of the coordinates is m. The RTT measured by the known antenna i is given as $t_{rti}$ [s].

The RSSI measured by the known antenna i is given as $RSSI_i$ [dBm].

If there is any item such as the property of the known antenna i, the cable length, or the like that affects the measurement value of each of the known antenna i, correction will be made in advance. For example, if the length of the cable that connects the known antenna i is larger than that of the cable that connects another known antenna, a cable delay and a cable loss may be greater than those of the other known antenna, and thus correction is performed by subtracting, from $t_{rti}$, the value that corresponds to the round trip of the cable delay so as to obtain $t_{rti}$ equivalent to that obtained in the condition of the other known antenna, and by adding, to $RSSI_i$, the value that corresponds to the cable loss so as to obtain RSSIi equivalent to that obtained in the condition of the other known antenna.

The two-dimensional coordinates of the terminal antenna 21 are given as $(x_s, y_s)$, and the three-dimensional coordinates of the terminal antenna 21 are given as $(x_s, y_s, z_s)$. These coordinates are unknow and the unit of the coordinates is m.

The sum of the terminal delay time and another type of delay time is given as $t_d$ [s]. This is also unknown.

The light speed c is assumed to be 299792458 [m/s]. This is exactly the same constant in any space.

The spatial propagation loss coefficient is given as $\alpha$. $\alpha = 2$ is satisfied in a free space, but, here, this is measured in advance based on the actual space, for example. The spatial propagation loss coefficient is thus known.

The wavelength of radio waves used for wireless communication is given as $\lambda$ [m]. This is known since if a channel is determined, the frequency is determined.

In the case of two dimensions, letting the distance between the known antenna i and an arbitrary point (x, y) be $d_i(x, y)$, the following expression is given.

$$d_i(x, y) = \sqrt{[(x_i - x)^2 + (y_i - y)^2]}$$

Similarly, in the case of three dimensions, letting the distance between the known antenna i and an arbitrary point (x, y, z) be $d_i(x, y, z)$, the following expression is given.

$$d_i(x, y, z) = \sqrt{[(x_i - x)^2 + (y_i - y)^2 + (z_i - z)^2]}$$

Letting the true distance between the known antenna i and the terminal antenna 21 be $l_i$ [m], the following expressing is satisfied in the case of two dimensions:

$$l_i = d(x_i, y_i),$$

and the following expressing is satisfied in the case of three dimensions:

$$l_i = d(x_i, y_i, z_i).$$

(2.2.2) RTT Evaluation Function trti which is the RTT measured by the known antenna i, is round trip time, and letting the distance that corresponds to one way thereof be a pseudo distance $l_{pi}$ [m], the following expression is given.

$$l_{pi} = ct_{rti}/2$$

This is the value that can be calculated based on a measurement value and is calculated based on $t_{rti}$ containing the delay time $t_d$, and thus the pseudo distance $l_{pi}$ [m] is longer than the true distance $l_i$ between the known antenna i and the terminal antenna 21.

Letting a difference between $l_{pi}$ and $l_i$ be $l_d$ [m], this is the distance that corresponds to one way of the delay time $t_d$, and thus $$l_d = ct_d/2, \text{ and } l_i = l_{pi} - l_d$$

are satisfied.

Here, the number of unknowns to be obtained in the case of two dimensions is three, namely, the coordinates $x_s$, $y_s$, and $l_d$ of the terminal antenna 21, and the number of unknowns to be obtained in the case of three dimensions is four, namely, the coordinates $x_s$, $y_s$, $z_s$, and $l_d$ of the terminal antenna 21. It is considered that these unknown coordinates are searched for, and the coordinates of the terminal antenna 21 are obtained. It is assumed that as estimate values during the search, three variables, namely, x, y, and l, are used in the case of two dimensions, and four variables, namely, x, y, z, and l are used in the case of three dimensions. The distance between the coordinates of the estimate values and the known antenna i is $d_i(x, y)$, in the case of two dimensions, and is $d_i(x, y, z)$, in the case of three dimensions.

Furthermore, the estimate value of the true distance, which can be obtained based on the estimate value l of the difference between the pseudo distance and the true distance, is $l_{pi}-l$.

If the estimate values are correct values, both values will match each other.

Accordingly, the values from which the differences are removed are respectively defined as RTT evaluation functions $f_{ti}$ for evaluating the estimate values, namely, in the case of two dimensions: $f_{ti}(x, y, l) = d_i(x, y) - (l_{pi} - l)$, and in the case of three dimensions: $f_{ti}(x, y, z, l) = d_i(x, y, z) - (l_{pi} - l)$.

(2.2.3) RSSI Evaluation Function

A model is employed in which letting the RSSI measured by bringing the terminal antenna 21 close to the known antenna i be B [dBm], the measured $RSSI_i$ satisfies the following expression:

$$RSSI_i = B - 10\alpha \log_{10}(4\Pi l_i / \lambda)$$

Here, assuming that $PRSSI_i$ [mW] is obtained by converting RSSIi into the notation of "mW" and $P_B$ [mW] is obtained by converting B into the notation of "mW", the following expression is satisfied.

$$P_{RSSIi} = P_B \{\lambda/(4\Pi l_i)\}^\wedge \alpha$$

If this is solved for $l_i$, the solution is given as:

$$l_i = \{\lambda/(4\Pi)\} P_B^\wedge(1/\alpha) \cdot P_{RSSIi}^\wedge(-1/\alpha).$$

Here, it is defined that $$r_B = \{\lambda/(4\Pi)\} P_B^\wedge(1/\alpha)$$
$$R_i = P_{RSSIi}^\wedge(-1/\alpha),$$

where $r_B$ is an unknown, whereas $R_i$ can be calculated based on a measurement value and is thus known. Accordingly, the following expression is satisfied.

$$l_i = r_B R_i$$

Accordingly, in the case of RSSI, the number of unknowns to be obtained in the case of two dimensions is three, namely, the coordinates $x_s$, $y_s$, and $r_B$ of the terminal antenna 21, and the number of unknowns to be obtained in the case of three dimensions is four, namely, the coordinates $x_s$, $y_s$, $z_s$, and $r_B$ of the terminal antenna 21. It is considered that these unknown coordinates are searched for, and the coordinates of terminal antenna are obtained. It is assumed that as estimate values during the search, three variables, namely, x, y, and r are used in the case of two dimensions, and four variables, namely, x, y, z, and r are used in the case of three dimensions. Similar to RTT, RSSI evaluation functions $f_{ri}$ for evaluating the estimate values are defined as follows:

In the case of two dimensions: $f_{ri}(x, y, r) = d_i(x, y) - rR_i$
In the case of three dimensions: $f_{ri}(x, y, z, r) = d_i(x, y, z) - rR_i$

(2.2.4) Range Evaluation Function

A range evaluation function is defined for imposing a penalty on an evaluation value if an estimate value of a coordinate or the like is outside a range in which the terminal is movable (can exist). The range evaluation function is set to be zero if the estimate value is within the range, and if the estimate value is outside the range, the range evaluation function is larger the more the estimate value deviates from the range.

For example, if, in the case of two dimensions, the estimate values needs to be within the range indicated by $$x_{min} < x < x_{max},$$
$$y_{min} < y < y_{max},$$
$$l_{min} < l < l_{max}, \text{ and } r_{min} < r < r_{max},$$

a range evaluation function $f_L$ of the coordinates can be defined as follows:

$$f_L(x, y, l, r) = f_{Lx}(x) + f_{Ly}(y) + f_{Ll}(l) + f_{Lr}(r)$$

Where $f_{Lx}(x) = x_{min} - x \quad (x < x_{min})$
$$\quad\quad\quad = 0 \quad\quad (x_{min} < x < x_{max})$$
$$\quad\quad\quad = x - x_{max} \quad (x > x_{max})$$
$$f_{Ly}(y) = y_{min} - y \quad (y < y_{min})$$
$$\quad\quad\quad = 0 \quad\quad (y_{min} < y < y_{max})$$
$$\quad\quad\quad = y - y_{max} \quad (y > y_{max})$$
$$f_{Ll}(l) = l_{min} - l \quad (l < l_{min})$$
$$\quad\quad\quad = 0 \quad\quad (l_{min} < l < l_{max})$$
$$\quad\quad\quad = l - l_{max} \quad (l > l_{max})$$
$$f_{Lr}(r) = r_{min} - r \quad (r < r_{min})$$
$$\quad\quad\quad = 0 \quad\quad (r_{min} < r < r_{max})$$
$$\quad\quad\quad = r - r_{max} \quad (r > r_{max})$$

(2.2.5) Simultaneous Equation

The following will describe an example of a method in which the evaluation functions are converted into simultaneous equations, the simultaneous equations are solved, and thereby the coordinates are obtained.

(2.2.5.1) Example of Calculation Method Using Only RTT (Similar to GPS

In order to calculate estimate values of coordinates based on four known antennas using a method similar to GPS, the three-dimensional RTT evaluation functions are combined to create simultaneous equations in the following manner.

$$f_{t1}(x, y, z, l) = 0$$
$$f_{t2}(x, y, z, l) = 0$$
$$f_{t3}(x, y, z, l) = 0$$
$$f_{t4}(x, y, z, l) = 0$$

By solving them, the solutions x, y, z, and l can be obtained and the position can be estimated. These simultaneous equations are nonlinear and thus are difficult to be analytically solved, but they can be solved using a Newton method. If there are four or more known antennas, similar simultaneous equations are created. However, the system of the equations is overdetermined because the number of equations (four) is greater than or equal to the number of unknown (four), and thus the equations cannot be solved. In this case, a least-squares method is used together to solve the equations. Also, in this case, more accurate position estimation is possible by using a weighted least-squares method in which the reliability w of the RTT measurement value for each known antenna is added as a weight to the corresponding equation.

Now, as an example in which the method similar to GPS is applied to two dimensions, and estimate the values of the two-dimensional coordinates are calculated, the following simultaneous equations are created.

$$f_{t1}(x, y, l) = 0$$
$$f_{t2}(x, y, l) = 0$$
$$f_{t3}(x, y, l) = 0$$
$$f_{t4}(x, y, l) = 0$$

The system of the equations is overdetermined since there are more equations (four) than the unknowns (three), and thus the equations can be solved using a Newton method together with a least-squares method. Also, in this case, more accurate position estimation is possible by using a weighted least-squares method in which the reliability w of the RTT measurement value for each known antenna is added as a weight to the corresponding equation.

(2.2.5.2) Example of Calculation Method When RTT Evaluation Function and Range Evaluation Function are Combined As an example in which the estimate values of the two-dimensional coordinates are calculated using RTT measurement values of four known antennas in combination with the range evaluation function, the following simultaneous equations are created.

$$f_{t1}(x, y, l) = 0$$
$$f_{t2}(x, y, l) = 0$$
$$f_{t3}(x, y, l) = 0$$
$$f_{t4}(x, y, l) = 0$$
$$f_L(x, y, l) = 0$$

Note however that in this case, there is no unknown r, which is specific for RSSI, the range evaluation function is given without using r, as, for example, $$f_L(x, y, l) = f_{Lx}(x) + f_{Ly}(y) + f_{L1}(l).$$

The system of the equations is overdetermined since there are four equations only for the RTT evaluation functions than the unknowns (three), and thus the equations can be solved using a Newton method together with a least-squares method. Also, in this case, due to the effect of the range evaluation function, a force is exerted such that the unknowns remain within a specific range. With this effect, a solution within the range is likely to be selected, preventing the solution from largely deviating from the range. Similar to the previous term, more accurate position estimation is possible by using a weighted least-squares method in which the reliability w of the RTT measurement value for a known antenna is added as a weight to the corresponding equation. A configuration is also possible in which a weight is also added to the equation of the range evaluation function, and based on the relative magnitude relation with the other weights, the intensity of the force for causing the coordinates of the solutions to remain within the range can also be set.

(2.2.5.3) Example of Calculation Method Using Only RSSI

As an example in which the estimate values of the three-dimensional coordinates are calculated using RSSI measurement values of four known antennas, the following simultaneous equations are created.

$$f_{r1}(x, y, z, r) = 0$$
$$f_{r2}(x, y, z, r) = 0$$
$$f_{r3}(x, y, z, r) = 0$$
$$f_{r4}(x, y, z, r) = 0$$

Similarly, as an example in which the estimate values of the two-dimensional coordinates are calculated using RSSI measurement values of four known antennas, the following simultaneous equations are created.

$$f_{r1}(x, y, r) = 0$$
$$f_{r2}(x, y, r) = 0$$
$$f_{r3}(x, y, r) = 0$$
$$f_{r4}(x, y, r) = 0$$

Similar to the case of RTT, the simultaneous equation are nonlinear and are thus difficult to be analytically solved, but they can be solved using a Newton method. If the system of the equations is overdetermined, a least-squares method can be used together to solve them. Furthermore, more accurate position estimation is possible by using a weighted least-squares method in which the reliability w of the RSSI measurement value for each known antenna is added as a weight.

(2.2.5.4) Example of Calculation Method When RSSI Evaluation Function and Range Evaluation Function are Combined As an example in which the estimate values of the two-dimensional coordinates are calculated using RSSI measurement values of four known antennas in combination with the range evaluation function, the following simultaneous equations are created.

$$f_{r1}(x, y, r) = 0$$
$$f_{r2}(x, y, r) = 0$$
$$f_{r3}(x, y, r) = 0$$
$$f_{r4}(x, y, r) = 0$$
$$f_L(x, y, r) = 0$$

Note however that in this case, there is no unknown l, which is specific for RTT, the range evaluation function is given without using l, as, for example, $$f_L(x, y, r) = f_{Lx}(x) + f_{Ly}(y) + f_{Lr}(r).$$

The system of the equations is overdetermined since there are four equations only for the RSSI evaluation functions than the unknowns (three), and thus the equations can be solved using a Newton method together with a least-squares method. Also, in this case, due to the effect of the range evaluation function, a force is exerted such that the unknowns remain within a specific range. With this effect, a solution within the range is likely to be selected, preventing the solution from largely deviating from the range. Similar to the previous term, more accurate position estimation is possible by using a weighted least-squares method in which the reliability w of the RSSI measurement value for a known antenna is added as a weight to the corresponding equation. A configuration is also possible in which a weight is also added to the equation of the range evaluation function, and based on the relative magnitude relation with the other weights, the intensity of the force for causing the coordinates of the solutions to remain within the range can also be set.

(2.2.5.5) Example of Calculation Method in which RTT and RSSI are Combined

As an example in which the estimate values of the two-dimensional coordinates are calculated using both RTT measurement values and RSSI measurement values of four known antennas, the following simultaneous equations are created.

$$f_{t1}(x, y, l) = 0$$
$$f_{t2}(x, y, l) = 0$$
$$f_{t3}(x, y, l) = 0$$
$$f_{t4}(x, y, l) = 0$$
$$f_{r1}(x, y, r) = 0$$
$$f_{r2}(x, y, r) = 0$$
$$f_{r3}(x, y, r) = 0$$
$$f_{r4}(x, y, r) = 0$$

Since the system of the equations is also overdetermined, they can be solved using a Newton method together with a least-squares method.

Furthermore, more accurate position estimation is possible by using a weighted least-squares method in which the equations of the RTT evaluation functions are each weighted with the reliability w of the RTT measurement value of the corresponding known antenna, and the equations of the RSSI evaluation functions are each weighted with the reliability w of the RSSI measurement value of the corresponding known antenna. Furthermore, it is also possible to adjust which type of measurement values are considered to be important by relatively increasing and decreasing the weights of RTT and the weights of RSSI.

(2.2.5.6) Example of Calculation Method in which RTT and RSSI Are Combined and Range Evaluation Function Is Also Used As an example in which the estimate values of the two-dimensional coordinates are calculated by using both RTT measurement values and RSSI measurement values of four known antennas are used and the range evaluation function is combined therewith, the following simultaneous equations are created.

$$f_{t1}(x, y, l) = 0$$
$$f_{t2}(x, y, l) = 0$$
$$f_{t3}(x, y, l) = 0$$
$$f_{t4}(x, y, l) = 0$$
$$f_{r1}(x, y, r) = 0$$
$$f_{r2}(x, y, r) = 0$$
$$f_{r3}(x, y, r) = 0$$
$$f_{r4}(x, y, r) = 0$$
$$f_L(x, y, l, r) = 0$$

Due to the effect of the range evaluation function, a force is exerted such that the unknowns remain within a specific range. With this effect, a solution within the range is likely to be selected, preventing the solution from largely deviating from the range. More accurate position estimation is possible by using a weighted least-squares method in which the reliabilities w of the RTT/RSSI measurement values are used as weights. A configuration is also possible in which a weight is also added to the equation of the range evaluation function, and based on the relative magnitude relation with the other weights, the intensity of the force for causing the coordinates of the solutions to remain within the range can also be set.

(2.2.6) Local Minimum Search

The following will describe an example of a method in which, instead of solving simultaneous equations, the evaluation functions are integrated into one error evaluation function, and the estimate values with which the value of the error evaluation function is minimal are searched for and optimized, thereby obtaining the coordinates.

(2.2.6.1) Error Evaluation Function

An error evaluation function $f_{error}$ is defined in which all of RTT evaluation functions, RSSI evaluation functions, and a range evaluation function of n known antennas are combined.

In the case of three dimensions, the following expression is given:

$$f_{error}(x, y, z, l, r) = \sum_{k=1}^{n}(w_{tk}f_{tk}(x, y, z, l))^2 + \sum_{k=1}^{n}(w_{rk}f_{rk}(x, y, z, r))^2 + (w_L f_L(x, y, z, l, r))^2$$

In the case of two dimensions, the following expression is given:

$$f_{error}(x, y, l, r) = \sum_{k=1}^{n}(w_{tk}f_{tk}(x, y, l))^2 + \sum_{k=1}^{n}(w_{rk}f_{rk}(x, y, r))^2 + (w_L f_L(x, y, l, r))^2$$

Where the weight $w_{ti}$ is the reliability of the RTT measurement value of the known antenna i, the weight $w_{ri}$ is the reliability of the RSSI measurement value thereof, and $w_L$ is the weight of the range evaluation function.

If any of the RTT, the RSSI, and the range evaluation function is not used, it is sufficient to use the error evaluation function from which the corresponding term is removed. The number of the parameters of the error evaluation function is up to five, namely, x, y, z, l, and r, but in the case of two dimensions, z is omitted, and if the RTT is not used, l is omitted, and if the RSSI is not used, r is omitted. Since either of the RTT and the RSSI must be used, the least number of parameters is three, namely, x, y, and l, or x, y, and r.

(2.2.6.2) Search

A combination of parameters with which the error evaluation function is minimal is searched for. A Newton method may be used to search for a local minimum, or an algorithm of a quasi-Newton's method such as a L-BFGS method may be used or Bayesian Optimization may be used to perform the search. There are also more simple methods such as a method in which all of possible combinations in a certain range are searched at certain intervals, and a method in which searches are performed at rough intervals in the beginning, and then the circumference in which the evaluation values may be low is sequentially searched for at smaller intervals.

When performing the search, all of the parameters may be searched for, but there is also a method in which l and r with which the error evaluation function is minimal are obtained based on the estimate values of the coordinates, instead of searching for l and r.

When, for example, the estimate values of the two-dimensional coordinates are defined as (x^, y^), it is sufficient to obtain the partial differential of l or r of the error evaluation function, and search for l or r whose partial differential is zero. Note that x^ and y^ mean "x-hat" and "y-hat". That is to say, l is searched for that satisfies the following Expression 2:

$$\frac{\partial}{\partial l}f_{error}(\hat{x}, \hat{y}, l, r) = 0$$

and r is searched for that satisfies the following Expression 3:

$$\frac{\partial}{\partial r}f_{error}(\hat{x}, \hat{y}, l, r) = 0$$

They are respectively used as the estimate values of l and r when the coordinates are (x^, y^), and the error evaluation function is evaluated. When this method is used, only the coordinates need to be searched for, and it is possible to significantly reduce the search space.

(2.3) Estimate Spatial Propagation Loss Coefficient α

In the description above, it is assumed that the spatial propagation loss coefficient α, which is needed for a method of obtaining coordinates based on RSSI, is a known value that is, for example, measured in advance. However, if many known antennas can be used, and measurements of both RTT and RSSI are possible and have a small measurement error, only the coordinates but also α can be estimated.

When the method using simultaneous equations is used, only the coordinates, l, and r but also α are defined as unknowns, and simultaneous equations are created. Since there are many known antennas and both RTT/RSSI measurement results can be used, the system of the equations is overdetermined, and it is thus possible to solve the equations using a Newton method together with a least-squares method. More accurate position estimation and α estimation are possible by using a weighted least-squares method in which the reliabilities w of the RTT/RSSI measurement values are used as weights. The range of α can be set for the equation of the range evaluation function. Furthermore, a configuration is also possible in which a weight is used and based on the relative magnitude relation with the other weights, the intensity of the force for causing α to remain within the range can also be set.

When the method with a local minimum search is used, an RSSI evaluation function and a range evaluation function are created using not only the coordinates, l, and r but also a as search targets, and an error evaluation function is formulated. Then, by searching for α and performing optimization, estimation is possible.

As a result of estimating a with these methods, there is no need to measure α in advance. Also, a method is possible in which the spatial α is once obtained by performing accurate measurement using many known antennas, and this α can also be used as a known value at the time of actual operation, so that position estimation is performed with a smaller number of known antennas and typical accuracy.

(2.4) Coordinate Stabilization Unit 33

Even if the terminal antenna 21 is still, the coordinates (hereinafter, referred to as instantaneous value coordinates)

obtained by the coordinate calculation unit 32 may finely vibrate. Accordingly, the coordinates (referred to as stabilized coordinates) from which fine vibration is removed by the coordinate stabilization unit 33 may also be obtained.

For example, a certain threshold is defined as a "allowance", and only if a difference or distance between the instantaneous value coordinates and the stabilized coordinates exceeds the threshold, the stabilized coordinates may be changed so as not to exceed the threshold, thereby making stabilization possible.

In addition, the instantaneous value coordinates are subjected to an LPF, a Kalman filter, or the like so that fine vibration is removed, and the resultant coordinates may be used as stabilized coordinates.

The processing of the constituent components of the aforementioned position estimation server 30 can be realized by a computer program for causing a computer to function as the constituent components of the position estimation server 30. This computer program can be stored in a computer-readable storage medium, or can be provided via a network.

REFERENCE SIGNS LIST

10 Wireless station
11 Known antenna
12 Signal transmission unit
13 Signal reception unit
14 RTT measurement unit
15 RSSI measurement unit
16 Timer
20 Wireless terminal station
21 Terminal antenna
22 Signal reception unit
23 Signal transmission unit
24 Control unit
25 Timer
30 Position estimation server
31 Measurement value statistical processing unit
32 Coordinate calculation unit
33 Coordinate stabilization unit
40 Wireless base station
41 Cable
42 Distributed antenna

The invention claimed is:

1. A position estimation method comprising:
transmitting a measurement signal and receiving a response signal between multiple n wireless stations respectively provided with known antennas i (i=1, 2, . . . , n) installed at known positions different from each other and a wireless terminal station provided with a terminal antenna installed at an unknown position;
measuring RTT, which is a round-trip delay time of the transmission and the reception;
obtaining coordinate information of an estimated position of the wireless terminal station with the terminal antenna in response to the measured RTT by the known antennas i;
applying the coordinate information to an RTT evaluation function $f_{ti}$ to evaluate the estimated position of the wireless terminal station with the terminal antenna, the RTT evaluation function $f_{ti}$ having terms relating to the coordinate information, a value of each of the terms being variable;
determine, by using a range evaluation function k, whether the value of each of the terms of the RTT evaluation function $f_{ti}$ is within an acceptable range in which the wireless terminal station with the terminal antenna is to be present, the range evaluation function $f_L$ having the terms;
setting a value of each of the terms of the range evaluation function $f_L$ to zero when the value of each of the terms of the RTT evaluation function $f_{ti}$ is within the acceptable range;
setting the value of each of the terms of the range evaluation function $f_L$ to a proportional value when the value of each of the terms of the RTT evaluation function $f_{ti}$ deviates from the acceptable range by a deviation amount, the proportional value being larger as the deviation amount becomes larger; and
estimating a position of the wireless terminal station with the terminal antenna based on either:
a solution of simultaneous equations of the RTT evaluation function $f_{ti}$ and the range evaluation function $f_L$; or
a value obtained by searching for an estimate value in a case in which an error evaluation function $f_{error}$ obtained by combining the RTT evaluation function $f_{ti}$ and the range evaluation function $f_L$ is minimum.

2. A position estimation system for estimating the position of the wireless terminal station by the position estimation method according to claim 1,
wherein the RTT measured by each of the multiple n wireless stations is forwarded to a position estimation server, and the position estimation server is configured to calculate the RTT evaluation function $f_{ti}$ and obtain the position of the wireless terminal station.

3. A position estimation system for estimating the position of the wireless terminal station by the position estimation method according to claim 1,
wherein the multiple n known antennas are distributed antennas that are disposed while being distributed from a wireless base station via cables having known lengths, the RTT measured for each distributed antenna by the wireless base station is forwarded to a position estimation server, and the position estimation server is configured to calculate the RTT evaluation function $f_{ti}$ and obtain the position of the wireless terminal station.

4. A position estimation server for estimating the position of the wireless terminal station by the position estimation method according to claim 1,
wherein the RTT measured by each of the multiple n wireless stations is forwarded to the position estimation server, and the position estimation server is configured to calculate the RTT evaluation function $f_{ti}$ and obtain the position of the wireless terminal station.

5. A non-transitory computer-readable medium having computer-executable instructions that, upon execution of the computer-executable instructions by a processor of a computer, cause the position estimation server according to claim 4 to function, so as to calculate the RTT evaluation function $f_{ti}$ and obtain the position of the wireless terminal station.

6. The position estimation method according to claim 1, further comprising:
calculating reliability w of the measured RTT by the known antennas i based on a number of the measurements and standard deviation; and
giving a weight wti corresponding to the reliability w to the RTT evaluation function $f_{ti}$.

7. A position estimation method comprising:
transmitting a measurement signal and receiving a response signal between multiple n wireless stations respectively provided with known antennas i (i=1, 2, ..., n) installed at known positions different from each other and a wireless terminal station provided with a terminal antenna installed at an unknown position;

measuring RTT, which is a round-trip delay time of the transmission and the reception;

measuring RSSI, which is a strength of received radio waves of the signals;

obtaining coordinate information of an estimated position of the wireless terminal station with the terminal antenna in response to the measured RTT and the measured RSSI by the known antennas i;

applying the coordinate information to an RTT evaluation function $f_{ti}$ and an RSSI evaluation function $f_{ri}$ to evaluate the estimated position of the wireless terminal station with the terminal antenna, each of the RTT evaluation function $f_{ti}$ and the RSSI evaluation function $f_{ri}$ having terms relating to the coordinate information, a value of each of the terms being variable;

determine, by using a range evaluation function k, whether the value of each of the terms of the RTT evaluation function $f_{ti}$ and the RSSI evaluation function $f_{ri}$ is within an acceptable range in which the wireless terminal station with the terminal antenna is to be present, the range evaluation function $f_L$ having the terms;

setting a value of each of the terms of the range evaluation function $f_L$ to zero when the value of each of the terms of the RTT evaluation function $f_{ti}$ and the RSSI evaluation function $f_{ri}$ is within the acceptable range;

setting the value of each of the terms of the range evaluation function $f_L$ to a proportional value when the value of each of the terms of the RTT evaluation function $f_{ti}$ and the RSSI evaluation function $f_{ri}$ deviates from the acceptable range by a deviation amount, the proportional value being larger as the deviation amount becomes larger; and estimating a position of the wireless terminal station with the terminal antenna based on either:
- a solution of simultaneous equations of the RTT evaluation function $f_{ti}$, the RSSI evaluation function $f_{ri}$, and the range evaluation function $f_L$; or
- a value obtained by searching for an estimate value in a case in which an error evaluation function $f_{error}$ obtained by combining the RTT evaluation function $f_{ti}$, the RSSI evaluation function $f_{ri}$, and the range evaluation function $f_L$ is minimum.

8. A position estimation system for estimating the position of the wireless terminal station by the position estimation method according to claim 7,
wherein the RTT and the RSSI measured by each of the multiple n wireless stations are forwarded to a position estimation server, and the position estimation server is configured to calculate the RTT evaluation function $f_{ti}$ and the RSSI evaluation function $f_{ri}$ and obtain the position of the wireless terminal station.

9. A position estimation system for estimating the position of the wireless terminal station by the position estimation method according to claim 7,
wherein the multiple n known antennas are distributed antennas that are disposed while being distributed from a wireless base station via cables having known lengths, the RTT and the RSSI measured for each distributed antenna by the wireless base station are forwarded to a position estimation server, and the position estimation server is configured to calculate the RTT evaluation function $f_{ti}$ and the RSSI evaluation function $f_{ri}$ and obtain the position of the wireless terminal station.

10. A position estimation server for estimating the position of the wireless terminal station by the position estimation method according to claim 7,
wherein the RTT and the RSSI measured by each of the multiple n wireless stations are forwarded to the position estimation server, and the position estimation server is configured to calculate the RTT evaluation function $f_{ti}$ and the RSSI evaluation function $f_{ri}$ and obtain the position of the wireless terminal station.

11. A non-transitory computer-readable medium having computer-executable instructions that, upon execution of the computer-executable instructions by a processor of a computer, cause the position estimation server according to claim 10 to function, so as to calculate the RTT evaluation function $f_{ti}$ and the RSSI evaluation function $f_{ri}$ and obtain the position of the wireless terminal station.

12. The position estimation method according to claim 7, further comprising:
calculating first reliability w1 of the measured RTT by the known antennas i based on a number of the measurements and standard deviation;
calculating second reliability w2 of the measured RSSI by the known antennas i based on a number of the measurements and standard deviation;
giving a weight wti corresponding to the first reliability w1 to the RTT evaluation function $f_{ti}$; and
giving a weight wri corresponding to the second reliability w2 to the RSSI evaluation function $f_{ri}$.

13. A position estimation method comprising:
transmitting a measurement signal and receiving a response signal between multiple n wireless stations respectively provided with known antennas i (i=1, 2, ..., n) installed at known positions different from each other and a wireless terminal station provided with a terminal antenna installed at an unknown position;

measuring RSSI, which is a strength of received radio waves of the signals;

obtaining coordinate information of an estimated position of the wireless terminal station with the terminal antenna in response to the measured RSSI by the known antennas i;

applying the coordinate information to an RSSI evaluation function $f_{ri}$ to evaluate the estimated position of the wireless terminal station with the terminal antenna, the RSSI evaluation function $f_{ri}$ having terms relating to the coordinate information, a value of each of the terms being variable;

determine, by using a range evaluation function $f_L$, whether the value of each of the terms of the RSSI evaluation function $f_{ri}$ is within an acceptable range in which the wireless terminal station with the terminal antenna is to be present, the range evaluation function $f_L$ having the terms;

setting a value of each of the terms of the range evaluation function $f_L$ to zero when the value of each of the terms of the RSSI evaluation function $f_{ri}$ is within the acceptable range;

setting the value of each of the terms of the range evaluation function $f_L$ to a proportional value when the value of each of the terms of the RSSI evaluation function $f_{ri}$ deviates from the acceptable range by a deviation amount, the proportional value being larger as the deviation amount becomes larger; and estimating a position of the wireless terminal station with the terminal antenna based on either:
- a solution of simultaneous equations of the RSSI evaluation function $f_{ri}$ and the range evaluation function $f_L$; or
- a value obtained by searching for an estimate value in a case in which an error evaluation function $f_{error}$ obtained by combining the RSSI evaluation function $f_{ri}$ and the range evaluation function $f_L$ is minimum.

14. A position estimation system for estimating the position of the wireless terminal station by the position estimation method according to claim 13,
wherein the RSSI measured by each of the multiple n wireless stations is forwarded to a position estimation server, and the position estimation server is configured to calculate the RSSI evaluation function $f_{ri}$ and obtain the position of the wireless terminal station.

15. A position estimation system for estimating the position of the wireless terminal station by the position estimation method according to claim 13,
wherein the multiple n known antennas are distributed antennas that are disposed while being distributed from a wireless base station via cables having known lengths, the RSSI measured for each distributed antenna by the wireless base station is forwarded to a position estimation server, and the position estimation server is configured to calculate the RSSI evaluation function $f_{ri}$ and obtain the position of the wireless terminal station.

16. A position estimation server for estimating the position of the wireless terminal station by the position estimation method according to claim 13,
wherein the RSSI measured by each of the multiple n wireless stations is forwarded to the position estimation server, and the position estimation server is configured to calculate the RSSI evaluation function $f_{ri}$ and obtain the position of the wireless terminal station.

17. A non-transitory computer-readable medium having computer-executable instructions that, upon execution of the computer-executable instructions by a processor of a computer, cause the position estimation server according to claim 16 to function, so as to calculate the RSSI evaluation function $f_{ri}$ and obtain the position of the wireless terminal station.

18. The position estimation method according to claim 13, further comprising:
calculating reliability w of the measured RSSI by the known antennas i based on a number of the measurements and standard deviation; and
giving a weight wri corresponding to the reliability w to the RSSI evaluation function $f_{ri}$.

* * * * *